United States Patent [19]

Torrano, Jr. et al.

[11] Patent Number: 4,679,087
[45] Date of Patent: Jul. 7, 1987

[54] METHOD AND APPARATUS FOR PHOTOGRAPHING VIDEO IMAGES OF EITHER POLARITY WITHOUT CRT BRIGHTNESS OR CONTRAST READJUSTMENT

[75] Inventors: Michael A. Torrano, Jr., Albany; George E. Lyon, San Francisco; David H. Haddick, Berkeley, all of Calif.

[73] Assignee: LogE/Dunn Instruments, Inc., San Francisco, Calif.

[21] Appl. No.: 588,473

[22] Filed: Mar. 12, 1984

[51] Int. Cl.⁴ .................... H04N 5/14; H04N 5/18; H04N 5/84

[52] U.S. Cl. .................... 358/168; 358/169; 358/244; 358/345; 358/172

[58] Field of Search ............ 358/160, 168, 169, 244, 358/345, 171, 172; 355/20

[56] References Cited

U.S. PATENT DOCUMENTS

| | | |
|---|---|---|
| 3,207,998 | 9/1965 | Corney et al. ............ 358/172 |
| 4,065,790 | 12/1977 | Siegel ............ 358/172 |
| 4,197,557 | 4/1980 | Tuma et al. ............ 358/168 |
| 4,403,254 | 9/1983 | Okada et al. ............ 358/172 |
| 4,415,921 | 11/1983 | Mulvanny et al. ............ 358/168 |
| 4,433,345 | 2/1984 | Haddick et al. ............ 358/244 |
| 4,530,011 | 7/1985 | Haddick ............ 358/244 |
| 4,564,863 | 1/1986 | Chameroy et al. ............ 358/172 |

Primary Examiner—James J. Groody
Assistant Examiner—Michael D. Parker
Attorney, Agent, or Firm—Pollock, Vande Sande & Priddy

[57] ABSTRACT

Apparatus and method for controlling a video signal amplitude excursion to provide a display image within a photographic acceptance range of a film. A clamping level is established for said video signal which maintains the brightness of the display monitor fixed. A gain controlled amplifier is serially connected to receive said video signal. The gain of the amplifier is set to control the contrast level for the monitor. Calibration means are provided to establish a light output from the display monitor within the optimum photographic acceptance range.

10 Claims, 11 Drawing Figures

METHOD AND APPARATUS FOR PHOTOGRAPHING VIDEO IMAGES OF EITHER POLARITY WITHOUT CRT BRIGHTNESS OR CONTRAST READJUSTMENT

RELATED APPLICATIONS

This application relates to U.S. patent applications Ser. Nos. 275,257, filed June 19, 1981, now U.S. Pat. No. 4,433,345, and Ser. No. 444,546, filed Nov. 26, 1982, now U.S. Pat. No. 4,530,011, both of which are assigned to the assignee of this application.

BACKGROUND OF THE INVENTION

This invention relates to the data recording art, and particularly to medical imaging, where it is common to electronically view and store pictorial and other data derived from radiographic, ultrasonic, nuclear magnetic resonance or other devices capable of non-destructively inspecting the interior of a living body.

The results of such an inspection are frequently displayed, in real time, on a device such as a cathode ray tube (CRT) for interpretation by the diagnostician. They may also be preserved for future reference by the use of a recording system wherein photographic film is sequentially exposed, on demand, to a series of desired video images derived from an independent high-resolution monitor CRT fed with video signals and connected in parallel with the viewing device.

Camera systems for making permanent copies of video monitor images are described in U.S. Pat. Nos. 4,027,315 and 4,240,729, both assigned to the assignee of this application. In such camera systems, a drift in CRT luminance output can result in a loss of image detail as a result of under or over exposure of the photographic film. In order to preserve the maximum resolution of the system, the absolute luminance output and luminance range of the CRT image require limitation and stabilization to prevent exposure errors on the film. Stabilizing the maximum image luminance output at a point just below the shoulder of the film density-versus-exposure characteristic avoids over exposing the film, with an attendant loss in image detail. A similar requirement exists for stabilizing the luminance output of image details to be recorded above the toe region of the film density-versus-exposure characteristic, in order to maximize the overall resolution of the recorded image.

The detail contained between the image luminance end points is of prime interest to the medical diagnostician. By maintaining the image end points at calibrated brightness levels, detail rendition is preserved. Any variation of the end points of the range of interest raises substantial questions as to whether a complete and accurate image is available upon which to provide a proper diagnosis. Image contrast in the area of diagnostic interest is extremely important, and its stabilization with respect to time enhances the confidence of the diagnostician in later-produced images.

The portion of the density-versus-exposure characteristic lying between the toe and shoulder regions of a given photographic material, known to those skilled in the art as the brightness acceptance range of the photographic emulsion, should therefore be matched to the absolute brightness and contrast range (i.e., luminance output range) of the CRT image, and be maintained in that matched state over at least the period of time during which photographs of the images are being made. Further, it is desirable to maintain this relationship for all of the photographic materials used in recording the video images, despite their differing density-versus-exposure characteristics, and regardless of image polarity. The aforesaid related patent applications describe, respectively, an automatic and a manual apparatus for maintaining the light output of a CRT of a monitor display within the prescribed brightness acceptance limits of a photographic film. Both types of apparatus have contrast and brightness controls which are set to produce a known exposure of a photographic film. First and second synthetic signals are generated which represent opposite ends of the video signal amplitude excursion. By referring to the Dunn Density Index TM for a given camera shutter speed and film type, the light output of the CRT for each of these synthetic signals which lies within the film light acceptance range may be predicted. The monitor brightness and contrast are adjusted to produce these known output light levels when excited with these synthetic signals. Once the contrast and brightness levels are appropriately set, the video signal will generate a CRT image within the brightness acceptance range of the selected film type. Photographs made of these images will contain a maximum of detail as a result of matching the CRT light output range to the photographic film acceptance range.

The apparatus described in these earlier patent applications, particularly that of Ser. No. 444,546, exhibits interaction between contrast and brightness adjustments which makes calibration tedious. Further, the brightness and contrast adjustment sequence is reversed when the image polarity is changed, which can confuse the camera operator when calibrating with an image of a changed polarity. The present invention is designed to overcome these difficulties.

SUMMARY OF THE INVENTION

The object of the present invention is to provide a video monitor producing high resolution images suitable for photographing. A more specific object of the invention is to provide a high resolution CRT monitor which generates images having a grey scale intensity, or luminance output, which remains constant and within the acceptance range of a photographic film.

It is an additional object of the invention to provide the user with a calibrated video monitor which permits rapid setting of brightness and contrast controls for producing images within the brightness acceptance range of a photographic film.

These and other objects are accomplished by a video monitor which provides brightness and contrast level controls which are non-interactive. A video signal for generating an image on a CRT is sampled at first and second levels representing first and second limits of the video signal amplitude excursion. The video signal subsequently displayed on the monitor is clamped so that the amplitude level which corresponds to one of the sampled levels is at a fixed, known DC level.

During calibration of the CRT monitor, the first and second sampled levels are applied to the monitor in sequence. The brightness level is established by adjusting the monitor brightness control to generate a desired low brightness light output from the CRT monitor when excited with the one sampled level. Next, the remaining sampled level is applied to the monitor and the contrast control is adjusted to generate a desired high brightness level. Subsequent video signals are clamped at the known DC voltage level and produce a light output on the CRT of the video monitor within the range defined by the high and low brightness levels.

In a preferred embodiment of the invention the sampled levels are time-multiplexed, along with the actual video signal, to provide calibration signals and the imagegenerating video signal to the monitor CRT. The multiplexed signals are applied to one input of a multiplier which receives, on a second input, a contrast control voltage. The resultant multiplied signal is applied to an amplifier having an output level clamped to a DC voltage level established during the video signal horizontal blanking period.

During calibration of the monitor, the luminance output of the CRT is set by applying the sampled signal, which produces the lowest illumination of the CRT. The grid bias on the CRT is adjusted until a desired light output is obtained from the CRT.

The contrast is set during calibration by applying a second sampled signal, between horizontal synchronization periods of the image generating video signal, to the multiplier. The luminance output of the CRT is thereafter adjusted to a known value by changing the contrast reference voltage.

Following the calibration procedure, the image-generating video signal is supplied to the multiplier by the multiplexer. During the blanking period which precedes each line of the video signal, the first sampled signal level is applied to the multiplier and the output amplifier clamps the video signal at a known DC level. Following the horizontal blanking period, the multiplexer supplies the video signal which is clamped at this level and produces an image having a luminance output within the required acceptance range.

DESCRIPTION OF THE PREFERRED EMBODIMENT

Figure 1:
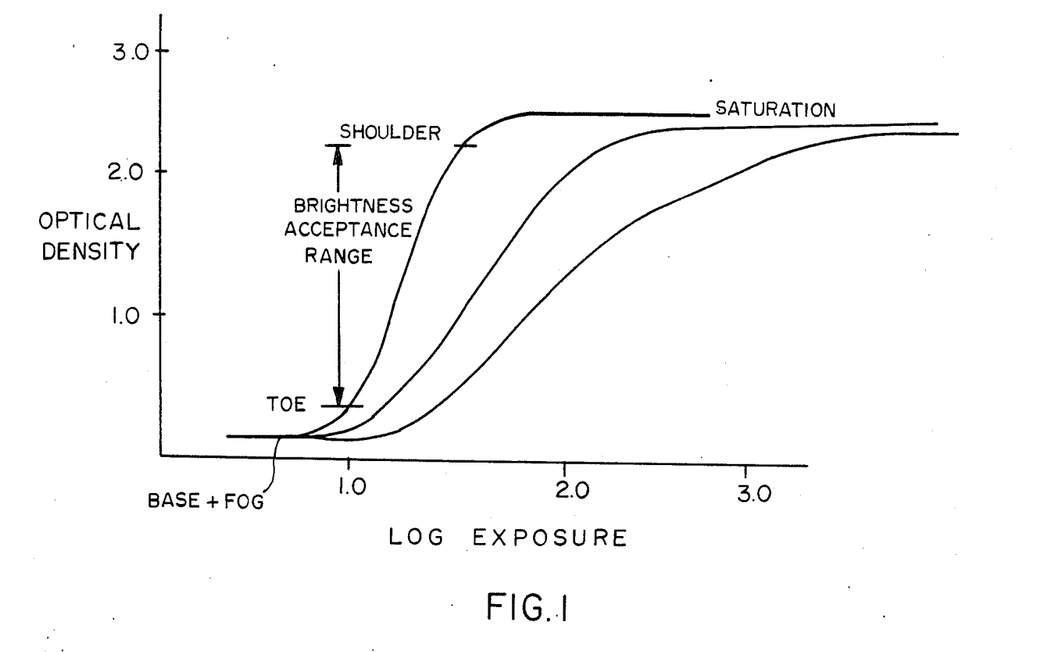
FIG. 1 illustrates the optical density of a photographic film with respect to a log exposure.

Referring now to FIG. 1, there is shown a plot of the optical density of a photographic film versus its exposure, the familiar log exposure curve, for three (3) types of film. The useful portion of the optical density lies between two points, shown as the shoulder and toe. Additional exposure above the shoulder provides a diminishing increase in optical density. At the other end of the curve, the toe region is shown, which defines the lower limit of the optical density versus log exposure curve, wherein a decreasing exposure produces a less than proportionate change in optical density.

When maximum recorded image detail is desired, the photographic films are exposed within the region defined by the shoulder and toe. Thus, by limiting the exposure of any of these films to the range between its shoulder and toe region, maximum detail is preserved and the resolution limiting portions of the log exposure curve, above the shoulder and below the toe region, are avoided.

Apparatus in accordance with the present invention is designed to maintain the brightness levels of a cathode ray tube (CRT) generated image within the brightness acceptance range of the log exposure curve.

Figure 2A:
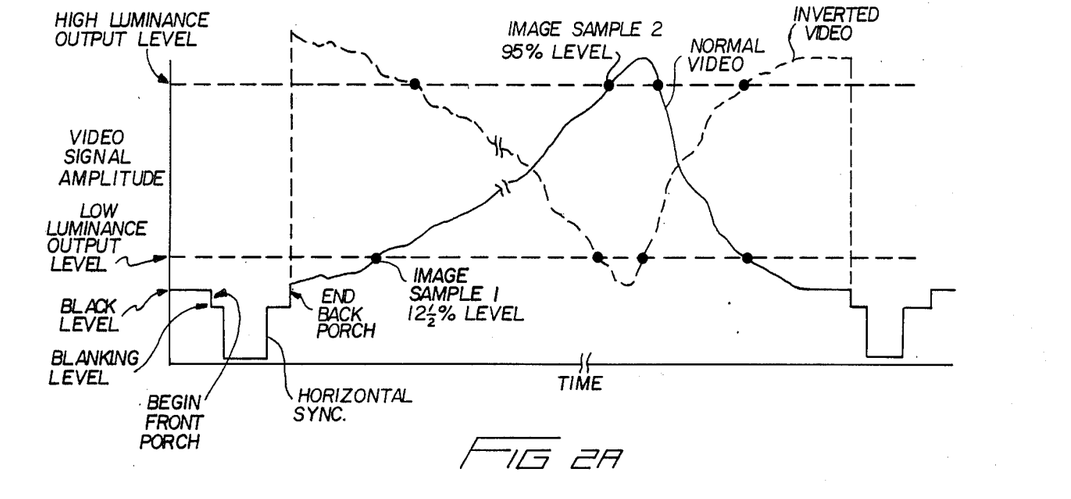
FIG. 2A is an illustration of a typical video signal for generating an image on a CRT monitor.

Referring to FIG. 2A, there is shown one horizontal line period of a normal image bearing video signal, beginning with a first horizontal sync pulse and terminating with the next horizontal sync pulse. The amplitude excursion of the normal video signal shown begins from a black level, which is $7\frac{1}{2}\%$ above the back porch level, and increases to a maximum, producing a maximum luminance level. The normal video signal thereafter declines to the black level and the front porch blanking level of the next sync pulse.

Additionally shown in FIG. 2A is an inverted video signal which can be seen to be the mirror image of the normal video signal. The video signal amplitudes shown must produce an optical density between the shoulder and toe regions of the log exposure curve of FIG. 1 in order to preserve the maximum picture detail, and to avoid the very non-linear regions of the log exposure curve. This result is required when either inverted or normal video is being processed, such that the inverted video signal also produces an optical density within the required brightness acceptance range. The apparatus in accordance with the present invention will provide for such control and maintain the video signal amplitude within the brightness acceptance range, thus compensating for circuit non-linearities and anomalies which result over time.

Figure 2B:
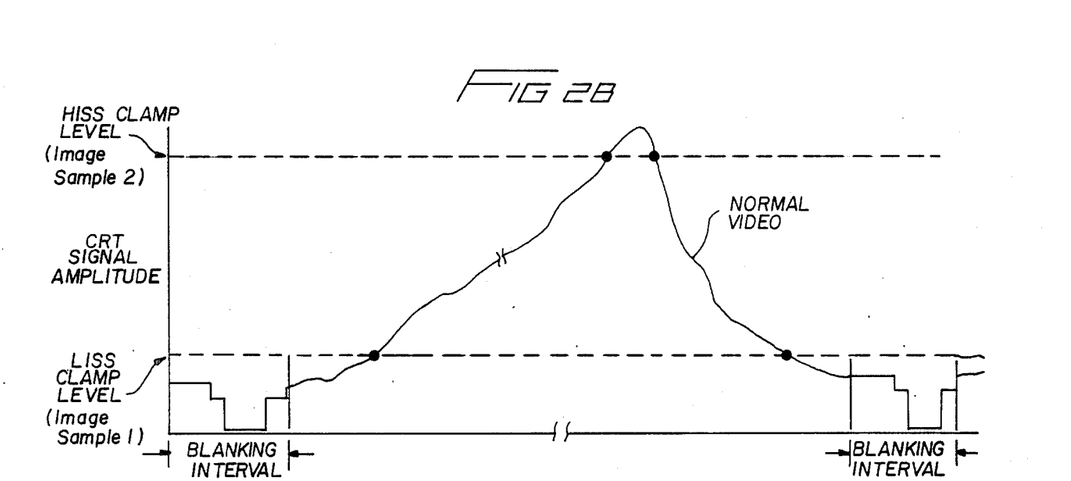
FIG. 2B illustrates the effect of the circuit of a preferred embodiment for generating an image on a normal video signal from which the synchronizing information has been stripped.

By referring to FIG. 2B, it is possible to describe the effect of the invention on the video signal to be displayed on the monitor after processing by the preferred embodiment. As shown, the horizontal synchronization pulses and front and back porch levels have been removed or stripped from the signal prior to processing. The present embodiment processes the video signal in its stripped condition, providing separate synchronizing information direct to the deflection circuit. The circuitry for decoding the video timing is standard and will not be described. The present invention will strip and clamp the video signal, such that a minimum brightness level for the cathode ray tube display is held at the clamp level. This sets the minimum brightness, which will lie at approximately the toe of the log exposure curve. Next, a reference level is set to control the gain of the amplifier processing the video signals, such that a maximum amplitude excursion of the video signal shown in FIG. 2B is maintained at approximately the shoulder region of the log exposure curve. Thus, the brightness of the display, as well as the contrast, is set to maintain the generated CRT image within the brightness acceptance range of the optical density versus log exposure curve for the film being used.

Figure 2C:
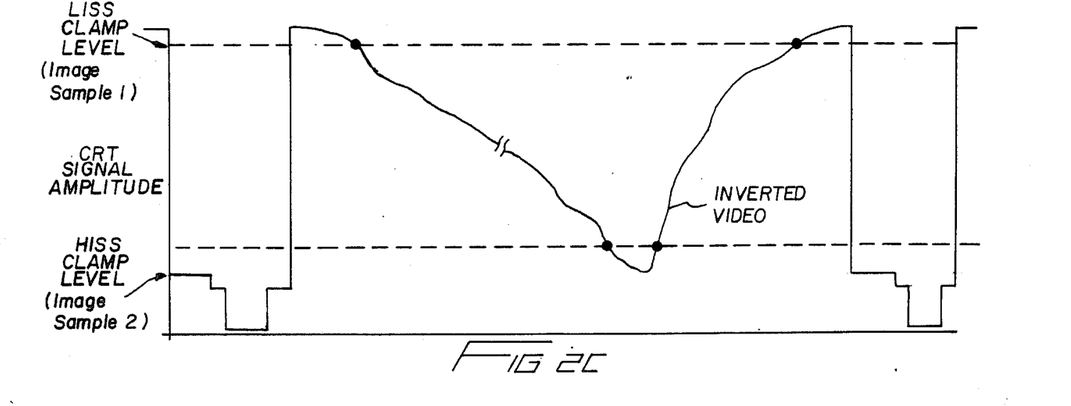
FIG. 2C illustrates the effect of the circuit on an inverted video signal from which the synchronizing information has been stripped.

The broken lines of FIG. 2A demonstrate first and second clamp levels of the video signal, representing signal levels near the limits of the video signal excursion. The present invention will establish a first DC clamp level for the video signal at image sample 1 such that, as shown in FIG. 2B, the video signal to be processed remains clamped to a known DC voltage input to the video monitor. During the blanking interval of the video signal to be displayed, the CRT drive video amplifier receives an input signal corresponding to image sample 1, in the case of a normal video signal, and generates a clamping voltage which will maintain the subsequent video signal DC clamped to the sample 1 level. In the case of an inverted signal, as shown in FIG. 2C, the clamping level will be established at the image sample 2 level. In both polarities, the video signal is clamped at the lower brightness level.

Conventional CRT display systems are often clamped at the back porch level of the video signal for both normal and inverted signal polarities. The video signal is thus clamped at one end or the other of the luminance range, depending upon the polarity of the displayed image. This requirement can generate confusion in the mind of the operator as a result of the transfer of control over the low luminance level of the image from the brightness adjustment to the contrast adjustment, accompanied by transfer of control over the high luminance level of the image from the contrast adjustment to the brightness adjustment. Alternative display systems have also been devised which employ dual sets of contrast and brightness controls, with selection between the pairs of controls being governed by switching which also determines the polarity of video fed to the CRT.

Figure 3A:
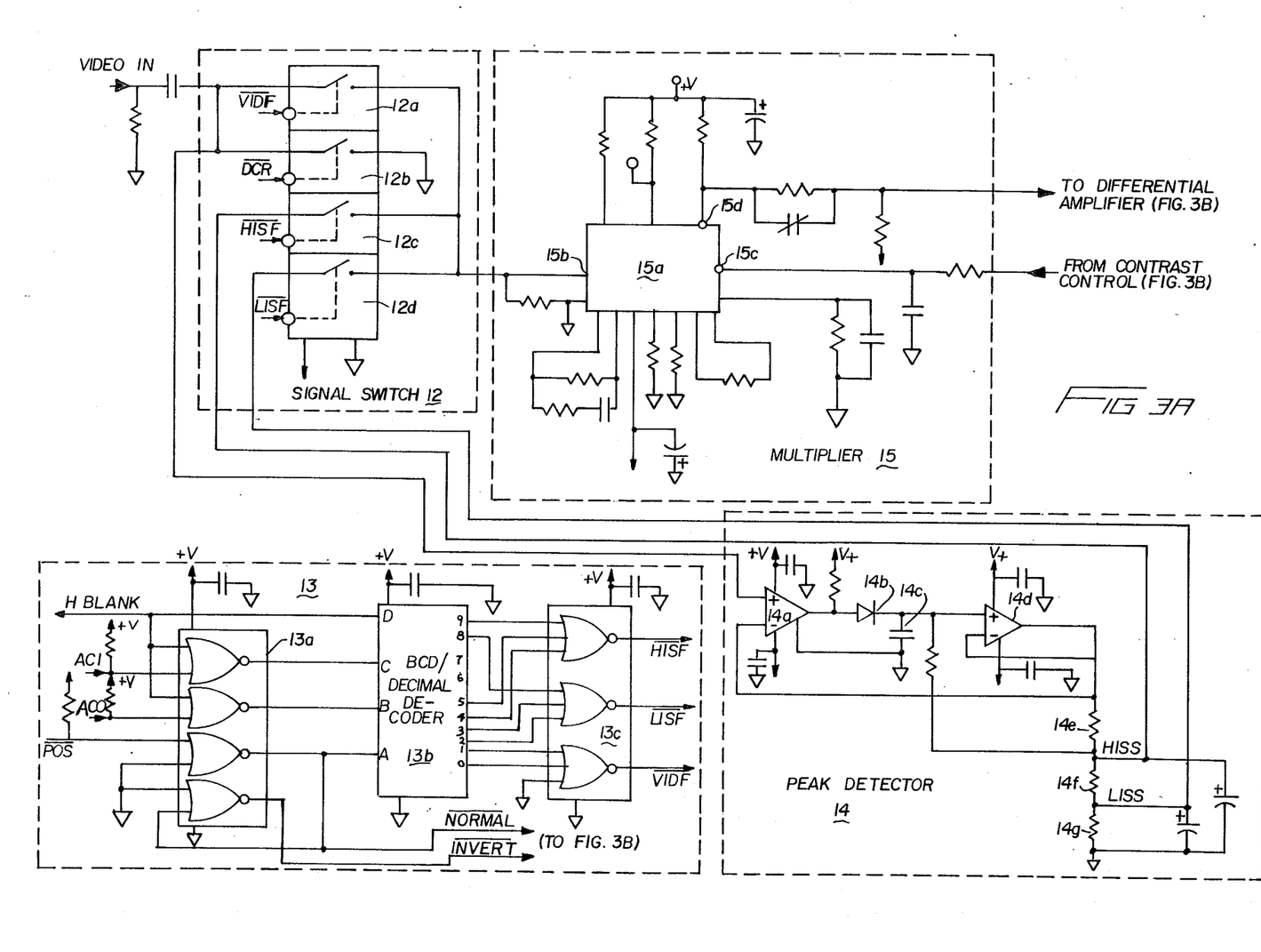
FIGS. 3A and 3B illustrate circuitry of a preferred embodiment for generating first and second synthetic calibration signals for calibrating the brightness range of the video monitor.
Figure 3B:
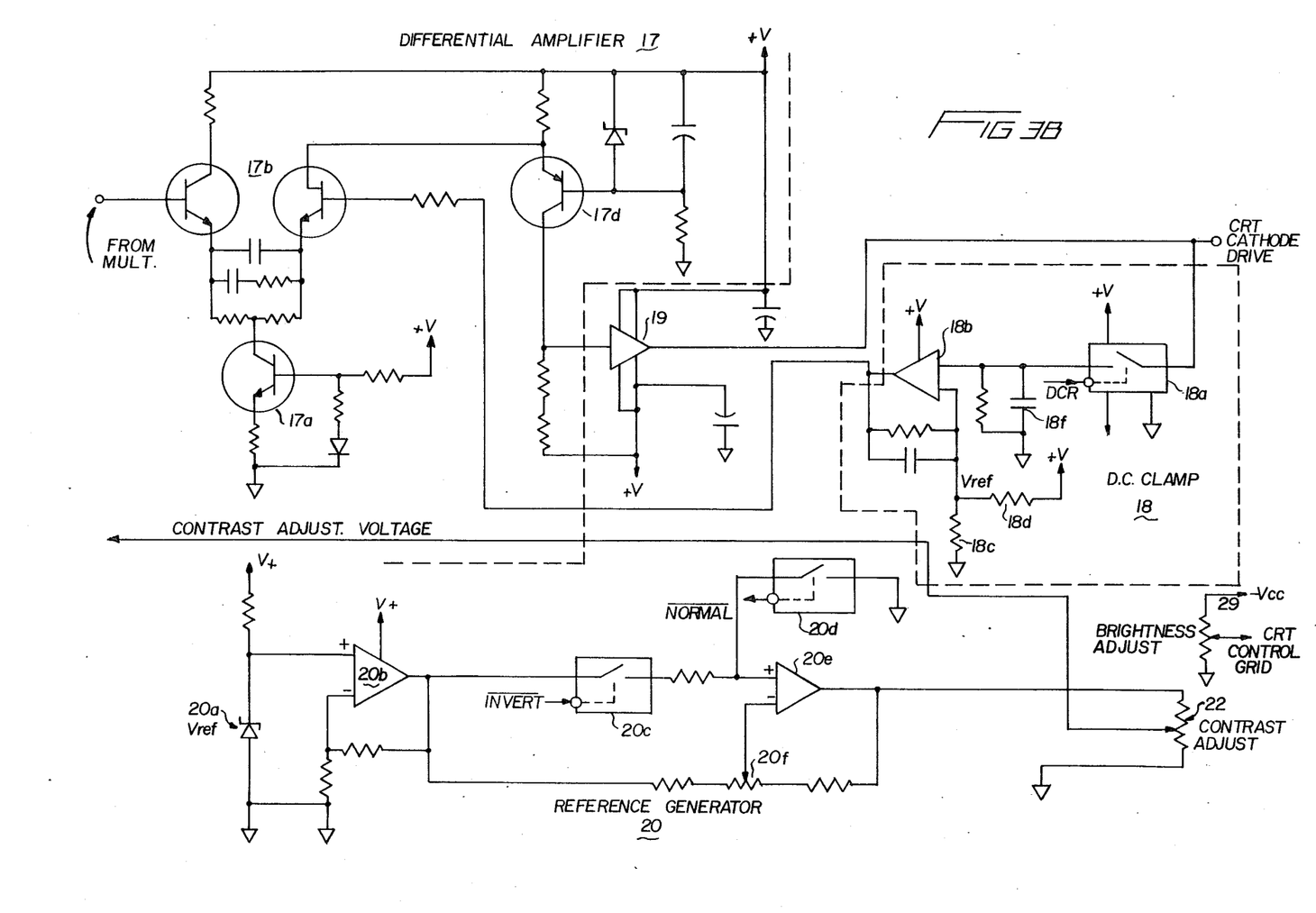

Referring now to FIGS. 3A and 3B, there is shown an electronic circuit for processing the video signal of FIG. 2A, such that its amplitude produces a cathode ray tube image lying within the brightness acceptance range of a photographic film. The apparatus of FIGS. 3A and 3B receives the signal of FIG. 2A, and DC restores said signal so that the back porch voltage equals ground potential, and provides an amplitude-controlled, DC voltage-clamped, video signal for driving the CRT cathode, thus producing the required image brightness.

The circuit of FIGS. 3A and 3B generates from the typical video signal of FIG. 2A first and second samples of the signal, one corresponding to a high brightness or HISS level and the other to a low brightness or LISS level. These samples are to be at approximately 12½% of the total amplitude excursion and at 95% of the peak amplitude excursion. A peak detector 14 is shown which receives as its input the typical video signal. Amplifier 14a supplies peak detector 14b, and the resulting peak voltage value is stored on a capacitor 14c. Additionally, amplifier 14d provides isolation for the sample signal on capacitor 14c, and current to the voltage divider network 14e, 14f and 14g. The resistors 14e, 14f and 14g are selected to provide a HISS level of 95% of the voltage of capacitor 14c and a LISS level comprising 12½% of the capacitor voltage. With the two sampled levels, it is possible to apply sequentially two video signal amplitudes to the monitor input for generating first and second illumination levels for the CRT, which can be used to set the brightness and contrast of the monitor.

The video signal and HISS and LISS levels of the peak detector circuit are applied to a signal switch 12, wherein any one of the applied signal may be selected. Switch 12B DC restores the input video to ground potential. In order to make the required brightness and contrast adjustments, these signals are applied in response to operator controls which permit a selection of either the normal video signal or the HISS or LISS level.

The outputs of the signal switch 12 are supplied to an input 15b of a multiplier circuit 15 where signal levels can be multiplied in accordance with a voltage applied to input 15c. Thus, by changing the polarity of the voltage on input 15c, the polarity of the video signal may be switched between a normal and inverted condition, as selected in accordance with an operator control. The output of the multiplier 15 is provided on terminal 15d.

It can therefore be seen that the multiplier 15 provides control over the polarity of the video signal to be applied to the cathode ray display, and is also used to control the gain imparted to the resultant signal. In this way, by controlling the gain of multiplier 15, the high luminance of the resulting image may be controlled.

Figure 4:
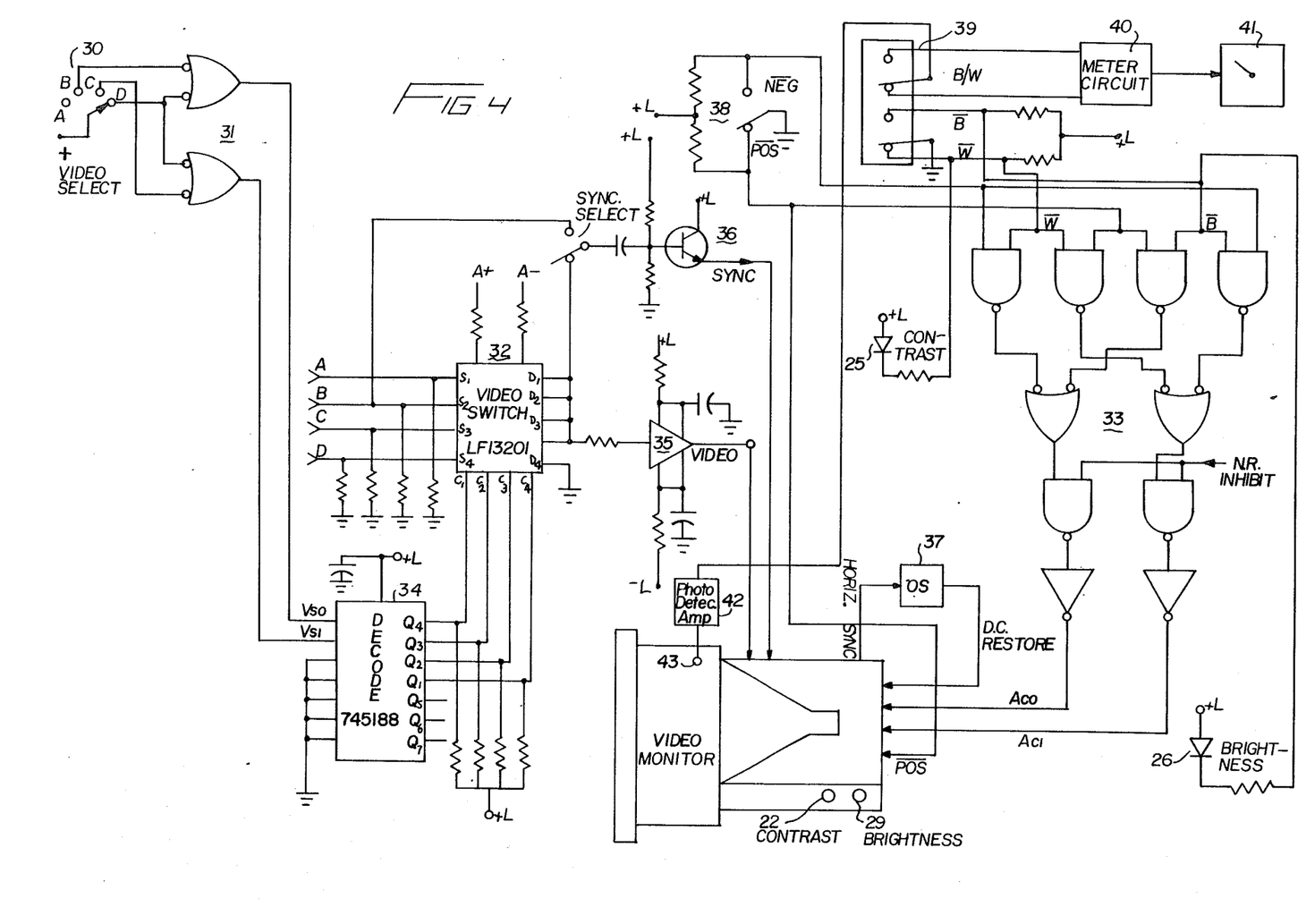
FIG. 4 illustrates the remaining circuitry for generating calibrating signals for the video monitor.

In order to select which one of the inputs of signal switch 12 is to be applied to multiplier 15, a switching control circuit 13 is provided. The switching control circuit 13 provides an energization of signal switch portion 12c when the $\overline{\text{HISF}}$ level is high. This condition of $\overline{\text{HISF}}$ is provided when the $AC_1$ and $AC_0$ signals, as well as the $\overline{\text{POS}}$ signal received from the circuit of FIG. 4, are in accordance with a desired format. The $\overline{\text{POS}}$ level is applied by a switch which is operator-controlled to either invert or maintain the video signal in a normal video signal mode. The $AC_1$ and $AC_0$ signals are generated by logic to be described, depending upon whether or not a contrast or brightness adjustment is to be made, whereby the HISS or LISS level will be selected. NOR gates 13a, 13c are connected as shown to the BCD to decimal decoder 13b to provide the HISS, LISS and video selection signal as required.

The BCD/decimal decoder also receives a horizontal blanking signal. The purpose of this is to enable either switch 12c or switch 12d during the blanking interval of the video signal generating the CRT image. In the case of a normal video signal, as indicated by the $\overline{\text{POS}}$=False signal, the LISS level is gated during horizontal blanking. The HISS level is gated during horizontal blanking when the $\overline{\text{POS}}$=True signal is being processed. As will be explained in greater detail with respect to FIG. 3B, these gated levels are used to develop clamping levels for the video signal. The active video applied to switch 12a is gated between horizontal blanking periods by VIDF.

Referring specifically to FIG. 3B, there is seen a differential amplifier 17 which receives, on one input, the output from multiplier 15a of FIG. 3A. The differential amplifier 17 includes a current source 17a for driving the emitters of a pair of transistors 17b. A common base amplifier 17d receives the common mode output signal of transistor pair 17b, and drives a drive amplifier 19. Drive amplifier 19 is connected to the CRT cathode drive for controlling the electron gun current such as to regulate the intensity of the electron beam.

The remaining input of differential amplifier 17 is connected, via a feedback circuit which comprises DC clamp circuit 18, to the output of amplifier 19. The DC clamp circuit 18 operates during the DC restore pulse, defined as the time lapsing from the trailing edge of the horizontal sync pulse to the termination of the adjacent back porch level of a standard video signal, to apply a feedback signal to the remaining input of differential amplifier 17. During the DC restore time, the voltage $V_{ref}$ is compared in amplifier 18b which is connected as a comparator with the output video signal, and the output video signal level is driven by the closed feedback loop to provide a fixed output signal equal to $V_{ref}$ from amplifier 19. During the DC restore time, which occurs during the horizontal blanking period, the LISS level associated with the recording of a normal video signal (NEG film image) is gated through signal switch 12d of FIG. 3A. The LISS level is therefore normalized to $V_{ref}$ and, during a subsequent line of video signal information, capacitor 18f will maintain the DC voltage level provided by amplifier 19 clamped in such a way that the LISS level of the video signal is maintained at $V_{ref}$. The clamping voltage of capacitor 18f is re-established during each DC restore period such that the video signal remains clamped at $V_{ref}$.

The consequence of clamping the video signal from amplifier 19 is that the LISS level always equals the reference voltage $V_{ref}$, and a standard luminance level is generated from the monitor CRT. During calibration, the LISS level is displayed during the visible portion of the video signal, and the first standard luminance level is set via the photometer 43 to provide an exposure of the photographic film which produces an optical density near the toe region of the film. This standard luminance output is thereafter maintained by continuously clamping the position of the video signal amplitude which corresponds to LISS (in the case of normal video) to $V_{ref}$ during each blanking period.

The remaining portion of FIG. 3B generates a contrast control voltage. A reference voltage is derived from zener diode 20a, and applied to a contrast adjust potentiometer 22. The controlled reference voltage is thereafter attenuated by potentiometer 22 to provide for accurate and stable control over the multiplier 15. To adjust contrast for a negative film image, the HISS level is displayed during the visible portion of the video signal and the second standard luminance level is set via meter 41.

During the INVERT mode of operation (recording a POS film image), the contrast voltage potential is inverted by the operation of gates 20c and 20d. Upon the closure of gate 20d, and opening of gate 20c in response to the INVERT condition selected by a manual operator control, the reference generator 20 will provide an inverted, stable reference voltage to contrast potentiometer 22.

Potentiometer 20f provides a balancing control to accurately set the inverted contrast voltage with respect to the normal contrast voltage. It is, of course, possible to provide an offset between the contrast of an inverted image with respect to a normal image, utilizing potentiometer 20f.

The circuit of FIGS. 3A and 3B is used to provide intensity control for the electron beam in the following manner. When the operator has selected the polarity of the image to be produced by the CRT, reference generator 20 (FIG. 3B) is set to provide the proper polarity of contrast reference voltage to multiplier 15a (FIG. 3A). Additionally, the operator will close the black/white (B/W) switch 39 (FIG. 4) to provide either the HISS level or LISS level to the monitor for display during calibration of the brightness and contrast controls. The selection of either HISS or LISS is a function of (1) the image polarity and (2) the setting of the B/W switch.

The generation of the selection signals for calibration of the monitor can be more clearly understood by referring to FIG. 4. In FIG. 4, there is shown the circuitry for controlling the video signal processing circuit of FIGS. 3A and 3B. FIG. 4 provides for a video switch 32 which can select inputs A, B, C or D in response to the setting of switch 30. Video select switch 30 is connected through a pair of NOR gates 31, as shown, to provide outputs $VS_0$ and $VS_1$, a two-digit binary number for selecting one of the four inputs A, B, C and D. The $VS_0$ and $VS_1$ binary signals are further decoded in decoder 34, and applied to video switch 32, connecting one of the selected signals to the input of video amplifier 35. The selected video signal, amplified by amplifier 35, corresponds to the video signal of FIG. 2A. The selected video signal is applied to the input of circuit 3A.

The image polarity switch 38 is shown in the $\overline{POS}$ position which is decoded by decoder 33, along with an input from the B/W switch 39. The following truth table indicates the logic levels of $AC_0$ and $AC_1$ under control of polarity switch 38 and B/W switch 39:

| B/W | POS | $AC_0$ | $AC_1$ |
|---|---|---|---|
| $\overline{B}$ | $\overline{POS}$ | 1 | 0 |
| $\overline{W}$ | $\overline{POS}$ | 0 | 1 |
| $\overline{B}$ | $\overline{NEG}$ | 0 | 1 |
| $\overline{W}$ | $\overline{NEG}$ | 1 | 0 | where 1=True, 0=False. Additionally, there are shown contrast indicator 25 and brightness indicator 26, in the form of LED indicators, which will inform the operator as to which control is to be adjusted during the calibration of the video monitor contrast and brightness controls 22, 29 (FIG. 3B).

the N.R. inhibit input to logic circuit 33 inhibits the selection of either the HISS or LISS levels when the camera is in a picture taking mode. Only during calibration is logic circuit 33 enabled to provide the required $AC_0$ and $AC_1$ signals.

Shown also in FIG. 4 is one shot pulse generator 37 which provides the DC restore pulse from the trailing edge of the horizontal sync pulse. The DC restore pulse lasts 1 microsecond.

The remaining circuitry of FIG. 4 includes a meter circuit 40 which is operatively connected to receive the output of photodetector amplifier circuit 42. Photodetector amplifier circuit 42 is connected to determine the light output from the video monitor during calibration, as sensed by photodetector 43. During the calibration sequence, wherein the video monitor brightness and contrast is adjusted, meter 41 will provide an indication of the relative light output from the video monitor under the first and second excitation conditions, whereby HISS and LISS signal levels are applied to the video monitor.

The calibration sequence for the video monitor can now be described with respect to FIGS. 5A-5D. The image polarity is selected by image polarity switch 38 which establishes a normal or inverting signal level of $\overline{POS}$ or $\overline{NEG}$. The B/W switch 39 is then operated to provide either a LISS or HISS level in accordance with the logic state of $AC_1$ or $AC_0$, respectively.

Figure 5A:
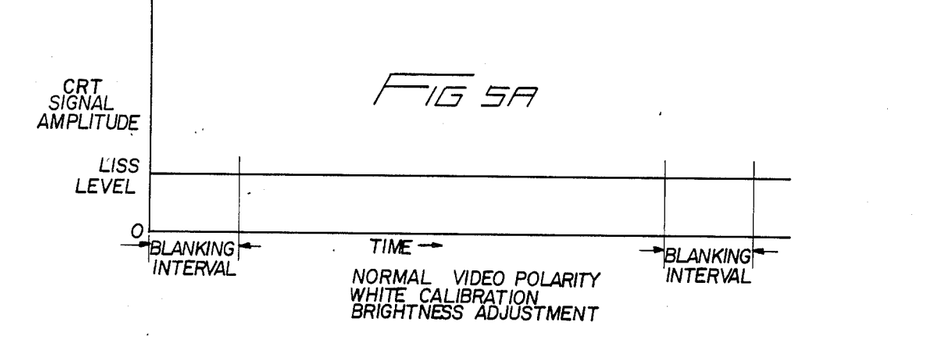
FIG. 5A illustrates the effect of circuitry of a preferred embodiment on a video signal of normal polarity, during white calibration by adjustment of the CRT brightness control.

As shown in FIG. 5A, if the image polarity is normal, i.e., a NEG film image, and the B/W switch is at $\overline{W}$, the LISS level will be applied to the video monitor input by switch 12d of FIG. 3A. The LED indicator 26 will light and the brightness control 29 (FIG. 3B) will be adjusted until meter 41 indicates that the light level detected will produce the appropriate exposure of the film used to photograph the CRT generated image. The meter 41 is calibrated to read the Dunn Density Index TM for a particular film type and camera shutter speed. Reference may be had to U.S. patent application Ser. No. 444,546 now U.S. Pat. No. 4,530,011 for a table giving the Dunn Density Index TM for various films and shutter speeds.

Figure 5B:
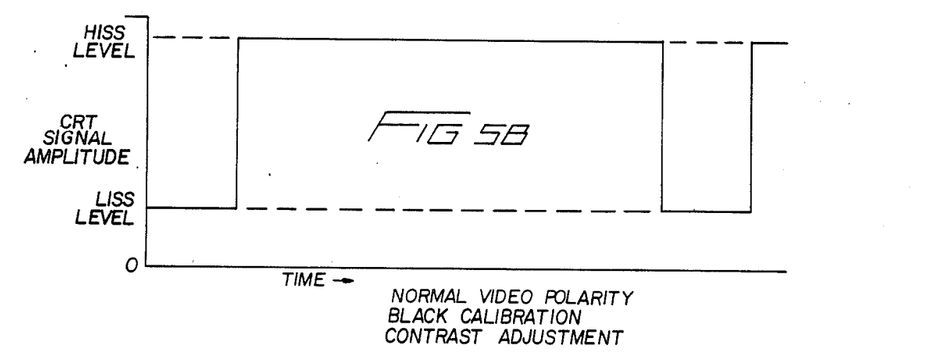
FIG. 5B illustrates the effect of circuitry of a preferred embodiment on a video signal of normal polarity, during black calibration by adjustment of the CRT contrast control.

After setting the brightness, the B/W switch is set to $\overline{B}$, whereupon contrast indicating LED 25 will light. The $AC_0$, $AC_1$ signal levels will assume a state which applies the HISS level to the video monitor input as shown in FIG. 5B. The contrast control 22 will then be adjusted to obtain the proper light output as indicated on meter 41.

Figure 5C:
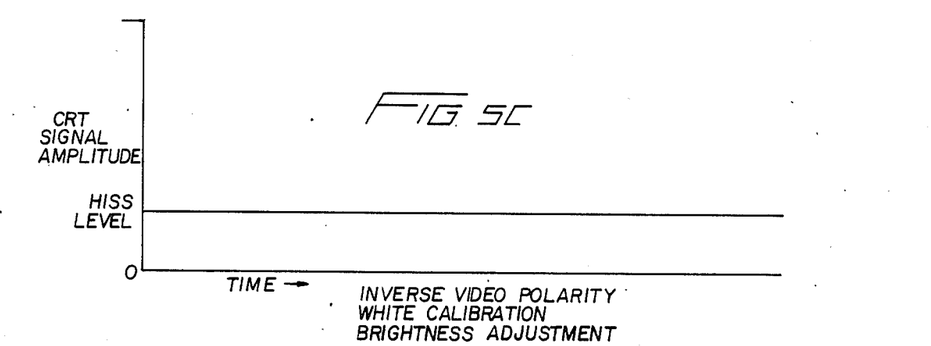
FIG. 5C illustrates the effect of circuitry of a preferred embodiment on a video signal of inverse polarity, during white calibration by adjustment of the CRT brightness control.
Figure 5D:
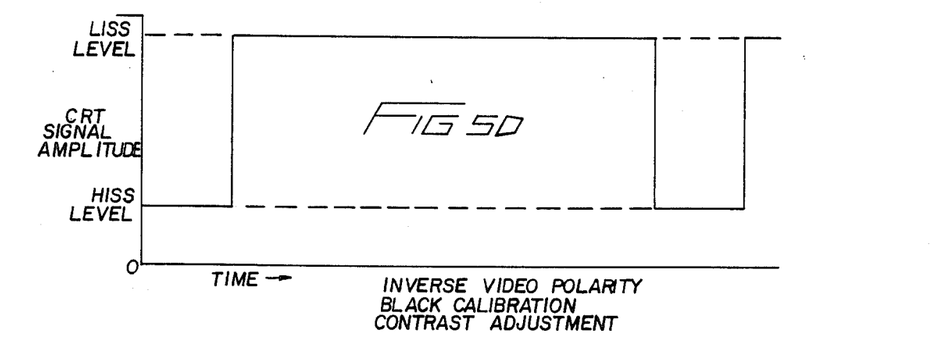
FIG. 5D illustrates the effect of circuitry of a preferred embodiment on a video signal of inverse polarity, during black calibration by adjustment of the CRT contrast control.

FIGS. 5C and 5D demonstrate the signal levels which are applied to the video monitor when the image polarity is inverted. The $AC_0$, $AC_1$ signal will assume a logic state which will apply a HISS level, corresponding to image sample 2 of FIG. 2C, to the video monitor input. The brightness level for the CRT under this sampled condition will be adjusted by brightness control 29 (FIG. 3B) until meter 41 indicates a light level which will produce the appropriate exposure of the film used to photograph the CRT generated image, the B/W switch having been in the $\overline{W}$ position.

After setting this brightness level, the B/W switch is set to $\overline{B}$, which will apply the LISS level of FIG. 5D to the video monitor input. Under this excitation condition, contrast control 22 will be adjusted to provide an appropriate light output level.

Following the calibration sequence, the B/W switch is returned to its neutral position and the information-bearing video signal is applied to the monitor for generating an image to be photographed.

It is also possible to implement an automatic control system whereby the operator directly enters the Dunn Density Index TM values, and the control electronics then determine the image luminance by adjusting the brightness and/or contrast functions, as necessary.

Thus, there has been described an embodiment of a manually adjustable high resolution video monitor which will permit the accurate calibration of the light output, whereby subsequent hardcopy photographs of images will all be recorded within the brightness acceptance range of the photographic film.

What is claimed is:

1. In a video display for generating normal and inverted images for photographing, a circuit for maintaining a video signal within a range required to produce a desired image brightness and contrast comprising:
    a detector circuit for sampling said video signal at first and second amplitude levels, said detector circuit producing HISS and LISS levels corresponding to said amplitude levels;
    a multiplier circuit having first and second voltage inputs for multiplication of two received voltages;
    a differential amplifier connected to receive an output level from said multiplier, and a reference signal, said reference signal controlling the output DC level of said differential amplifier;
    a drive amplifier connected to receive an output signal from said differential amplifier;
    a sample circuit connected to detect a signal from said drive amplifier during a blanking interval, said sample circuit providing a clamped voltage reference signal to said differential amplifier based on a sampled level of the signal from said drive amplifier, whereby during the remaining interval of said video signal, said differential amplifier output voltage is clamped to a known DC level by said clamped reference signal;
    a contrast control connected to apply a voltage level to said multiplier second input; and
    a switch for applying, during a blanking interval of said video signal one of said HISS or LISS levels, whereby said clamped voltage reference signal is produced, and during monitor CRT calibration selectively applying in sequence following said blanking interval, one of said HISS or LISS levels to said multiplier first input, depending on the polarity of the image to be produced, whereby the brightness adjustment for said image is selected under excitation of one of said HISS or LISS levels and the contrast adjustment is selected under excitation of the other of said HISS and LISS levels to establish an image brightness within said range.

2. A method for controlling a video signal amplitude excursion between a back porch reference level and a peak amplitude level to derive a displayed image producing a light output range on a video display within an acceptance range of a photographic film comprising:
    sampling said video signal at a first known portion of said video signal to produce a first sampled level;
    establishing a clamping reference level for said video signal during the back porch interval which will produce a known DC level when said video signal equals said sampled level;
    clamping said video signal with said reference level, whereby a DC level for said video signal is established during each back porch interval;
    sampling said video signal at a second known portion of said signal between the commencement of said back porch level and said peak amplitude level to produce a second sampled level;
    applying said first and second sampled levels to a gain controlled circuit serially connected with said video display to receive said video signal;
    measuring the light output from an image produced on said display in response to a signal from said gain controlled circuit; and
    adjusting the brightness of said video display when the first sampled level is applied and the gain of said gain controlled circuit when the second sampled level is applied until a desired light output corresponding to said acceptance range is obtained.

3. An apparatus for maintaining the brightness and contrast of a CRT display image generated in response to a video signal within a predetermined range comprising:

means for sampling said video signal at first and second levels representing first and second ends of said video signal to produce first and second level signals;

multiplex means for receiving said video signal and said first and second level signals, and passing one of said received signals in response to a control signal;

a multiplier connected to receive the signal passed by said multiplex means, and a reference signal;

a clamping amplifier connected to receive a signal from said multiplier and for clamping said video signal at a clamping level determined when said first level signal is applied during a blanking interval of said video signal to said multiplier;

means connected to said multiplex means for applying said first level signal to said multiplier during said blanking interval whereby said clamping amplifier establishes said clamping level, and selectively applying either said second level signal or said first level signal during the remaining portion of said video signal, whereby said CRT image will have light output level clamped to said first level, and said video display brightness and contrast may be adjusted to derive said predetermined range when said second or first level signals are selectively applied to said multiplier.

4. The apparatus of claim 3 further comprising a reference generator connected to provide a variable voltage reference signal to said multiplier.

5. The apparatus of claim 4 wherein said reference generator provides a variable voltage signal of first and second selectable polarities.

6. In a video display monitor for generating normal and inverted images for photographing from a video signal, a circuit for establishing image brightness comprising:

a first sampling apparatus for generating a first image sample of said video signal at a first known level of said video signal between horizontal blanking intervals of said video signal;

means for applying during a blanking interval of said video signal said first determined image sample to said monitor;

a clamping amplifier for clamping said video signal at a reference level so that subsequent portions of said video signals having the same level as said first image sample produce the same level from said clamping amplifier;

means during a calibration sequence for selectively applying during the remaining period of said video signal said first image sample to said video display monitor; and means for adjusting the brightness of said video display in response to said applied image sample to a desired image brightness.

7. The circuit of claim 6 further comprising:

a multiplier for multiplying said video signal by a control signal;

a second sampling apparatus for generating a second image sample proportional to a second known level of said video signal;

means for applying said second image sample to said multiplier, whereby a video imge light output is established proportional to said known level;

contrast control means connected to supply said control signal to said multiplier; and means for monitoring the video image light output level produced by said video display when said first and second image samples are applied to said monitor, whereby said means for adjusting brightness and said contrast control means may be adjusted to derive a predetermined contrast range.

8. In a video display monitor for generating normal and inverted images for photographing from a video signal, a circuit for establishing image brightness comprising:

a sampling apparatus for generating an image sample of said video signal at a known portion of said video signal between horizontal blanking intervals of said video signal;

means for applying during a blanking interval of said video signal said generated image sample to said monitor; and, a clamping amplifier for clamping said video signal at a reference level so that subsequent portions of said video signals having the same level as said image sample produce the same level from said clamping amplifier.

9. In a video signal CRT display monitor, an apparatus for maintaining the light output level of a CRT generated image fixed with respect to a reference level comprising:

means for applying a video signal to said CRT display monitor;

means for sampling said video signal at a level which represents one end of said video signal to produce a sampled signal level;

an amplifier having a signal input for receiving said video signal, and a reference input for establishing a DC reference level for said video signal;

second means for sampling connected to said amplifier output, for providing a voltage proportional to said amplifier output voltage in response to a sampling signal;

a differential amplifier connected to receive a reference voltage, and to receive said proportional voltage from said second means for sampling said differential amplifier providing a reference output voltage to said amplifier; and means for simultaneously applying said sampled signal level to said amplifier signal input, and for applying said sampling signal to said second means for sampling, whereby said differential amplifier generates an error signal for maintaining said amplifier output signal at said reference level, whereby the light output of said monitor is maintained in a fixed relationship with respect to said video signal sampled amplitude.

10. The apparatus of claim 9 wherein said sampled signal level is applied to said signal input, and said sampling signal is applied by said second means for sampling during the horizontal blanking time of said video signal.

* * * * *